United States Patent [19]
Tijsma et al.

[11] 3,986,092
[45] Oct. 12, 1976

[54] STABILIZATION SYSTEM FOR A PLATFORM SUSPENDED IN A GIMBAL FRAME

[75] Inventors: Sjoerd Tijsma; Gerrit Johan Hendrik Spenkelink, both of Hengelo, Netherlands

[73] Assignee: Hollandse Signaalapparaten B.V., Hengelo, Netherlands

[22] Filed: Mar. 9, 1973

[21] Appl. No.: 339,863

[30] Foreign Application Priority Data
Mar. 15, 1972  Netherlands .................... 7203387

[52] U.S. Cl. .................................................. 318/649
[51] Int. Cl.² ........................................ B64C 17/06
[58] Field of Search ........... 318/649, 648, 618, 621; 74/5.4

[56] References Cited
UNITED STATES PATENTS

| | | | |
|---|---|---|---|
| 2,945,643 | 7/1960 | Slater .............................. | 318/649 X |
| 2,977,804 | 4/1961 | French ............................ | 318/649 X |
| 3,099,005 | 7/1963 | Goldberg ........................ | 318/648 X |
| 3,184,662 | 5/1965 | Wallace .......................... | 318/621 |
| 3,230,351 | 1/1966 | Platt et al. ...................... | 318/648 X |
| 3,246,220 | 4/1966 | Shinners ......................... | 318/618 |
| 3,456,511 | 7/1969 | Clark et al. ..................... | 74/5.4 |
| 3,471,108 | 10/1969 | Corso ............................. | 318/649 X |
| 3,665,283 | 5/1972 | LeGall ............................ | 318/649 |
| 3,830,447 | 7/1974 | Phillips .......................... | 318/648 X |

*Primary Examiner*—James R. Scott
*Attorney, Agent, or Firm*—Frank R. Trifari; George B. Berka

[57] ABSTRACT

A stabilization system for a platform suspended in a gimbal frame comprises a motor tachometer combination mounted on the frame for tilting the platform about an axis, a gyro suspended on the platform and driving a synchro to provide a servo loop for controlling the motor, a preamplifier and an amplifier with a negative feedback via the motor-tacho combination to align the platform, and an angular velocity indicator mounted on the frame to produce outside the servo loop a correction signal for the tacho feedback signal.

2 Claims, 6 Drawing Figures

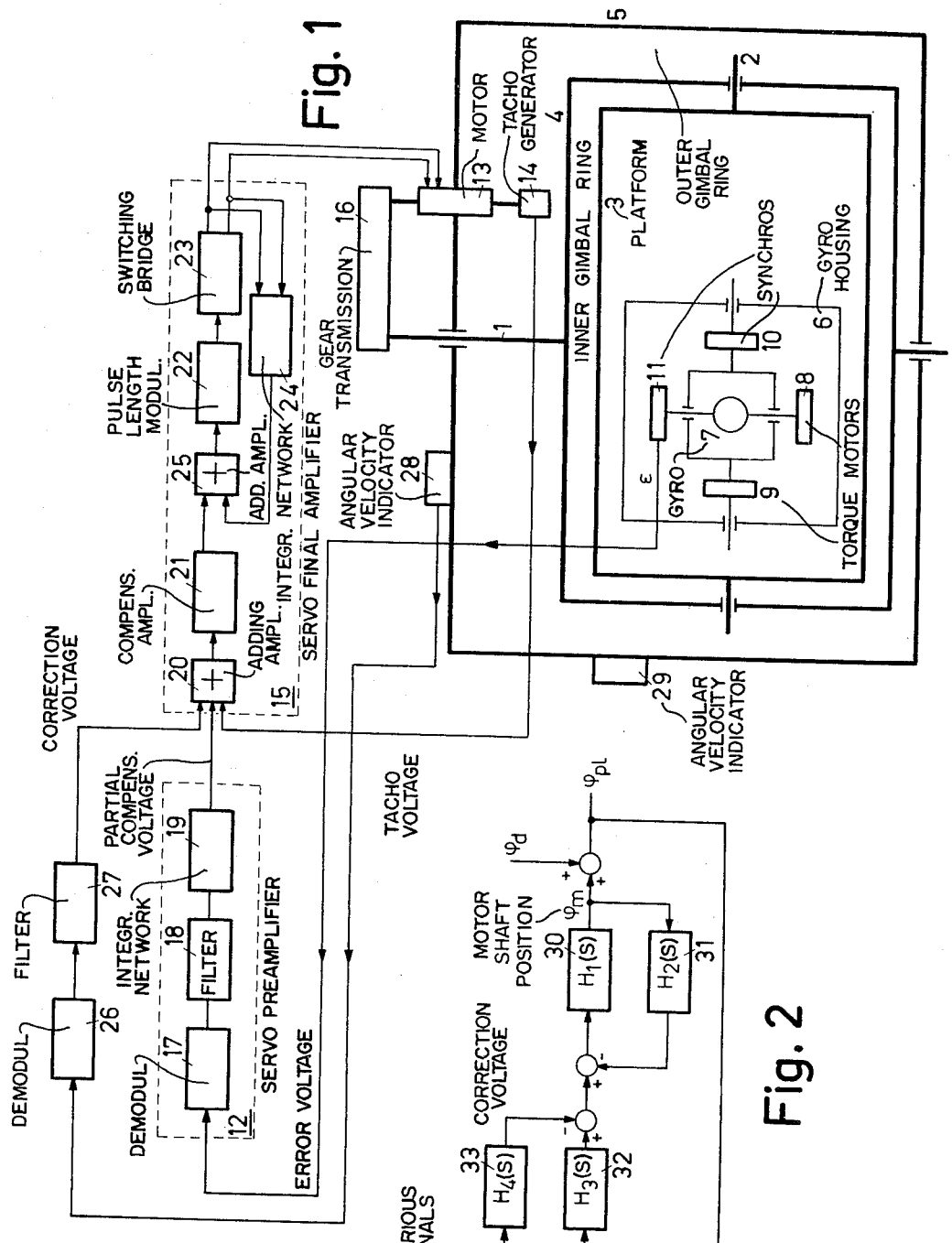

STABILISATION SYSTEM FOR A PLATFORM SUSPENDED IN A GIMBAL FRAME

The present invention relates to a system for the stabilisation of a platform suspended in a gimbal frame about two axes perpendicular to each other, employing a gyro-driven servo system which comprises, for the purpose of the stabilisation about each of said axes, a servo preamplifier and, connected thereto, a servo final amplifier with negative feedback via a motor-tacho combination, whereby the motor controlled by the servo final amplifier is capable of tilting the platform about the relevant axis with respect to the frame.

A stabilisation system for a platform suspended in a gimbal frame is described in the Dutch patent application No. 7,017,134, while an embodiment of the servo system, as described in the opening paragraph, may be found in the Dutch patent application No. 7,106,851.

Such a stabilisation system is used, for example, on ships where a radar antenna system is to be mounted on a stabilised platform. The platform is then suspended by two concentric gimbal rings of which the outer ring is fixed to the ship. A special embodiment is described in the U.S. Pat. No. 3,358,285, where the outer gimbal ring is rigidly supported parallel to the deck by the inner wall of a substantially spherical radome being fixed to the ship.

The servo motors, with which the platform in the gimbal rings can be tilted about two axes perpendicular to each other, are mounted on the gimbal frame. Assuming that the platform is in a completely stabilised state, i.e. it has followed up a vertical gyro, and that, subsequently, ship movements are present, the relevant motor shafts will rotate with respect to the ship, owing to the fact that the motors are mounted on the gimbal frame. The tacho generators coupled to the motors will therefore supply a negative feedback voltage to the servo final amplifier with the result that the motors controlled by this amplifier will bring the previously stabilised platform a little out of its stabilised state. This problem could be solved by omitting the tacho negative feedback, but this would have an adverse effect on the properties of the servo system.

A second known solution could be obtained by omitting the tacho negative feedback, but substituting for this a feedback of the platform movement. To this effect, an angular velocity indicator mounted to the platform should then be employed, such as for example a rate gyro or an integrating angular accelerometer. The use of either a feedback of the motor motion or a correspondingly dimensioned feedback of the platform movement in the stabilisation system does not affect the dynamic properties with respect to, for example, the stabilising effect and the resistance to spurious torques. A solution to the indicated problem by feedback of the platform movement would, however, be attributable to the fact that the negative feedback voltage is practically zero, since the absolute movement of the platform, remaining in principle horizontal, is measured. This feedback voltage is not considered to be disturbing and, hence, need not be compensated for by a control voltage usually derived from a positioning error, i.e. an error that corresponds with a deviation of the platform position with respect to the position of the vertical gyro. Hence, the positioning error will remain practically zero and the platform will retain its horizontal position. In practice, however, this solution does not appear to be satisfactory due to the gear transmission system between the motor and the angular velocity indicator (platform). The play and resilience introduced by said transmission system have, in combination with the masses present, a destabilising effect on the tacho loop which is now formed by the motor, the transmission system, the angular velocity indicator and the servo final amplifier with negative feedback via these elements. The resonance frequency of the mass-resilient system formed by the platform and the gear transmission system limits the tacho loop bandwidth to such an extent that the desired system bandwidth cannot be realised.

The solution of the above problem, as offered by the present invention, is attributable to the fact that two measuring instruments are mounted on the gimbal frame, each instrument providing a signal which is a measure for the angular velocity of the frame about the relevant axis and which results in a voltage that, being fed to the respective servo final amplifier, reduces the above-mentioned servo errors inherent to the system.

The solution according to the invention is therefore due to the injection of a compensation signal for the tacho negative feedback voltage into the servo system, which compensation signal is generated outside the servo loop and is therefore excluded from all (in particular mechanical) imperfections in the servo loop.

The measuring instruments used are angular velocity indicators, such as rate gyros, although laterally sensitive angular accelerometers can also be applied, but the latter are not advisable owing to the substantially higher cost attached thereto.

The invention will now be described with reference to the figures, of which:

FIG. 1 illustrates diagrammatically the stabilisation system according to the invention;

FIG. 2 shows a very simplified block diagram, illustrating the operation of the stabilisation system.

Figure 4:
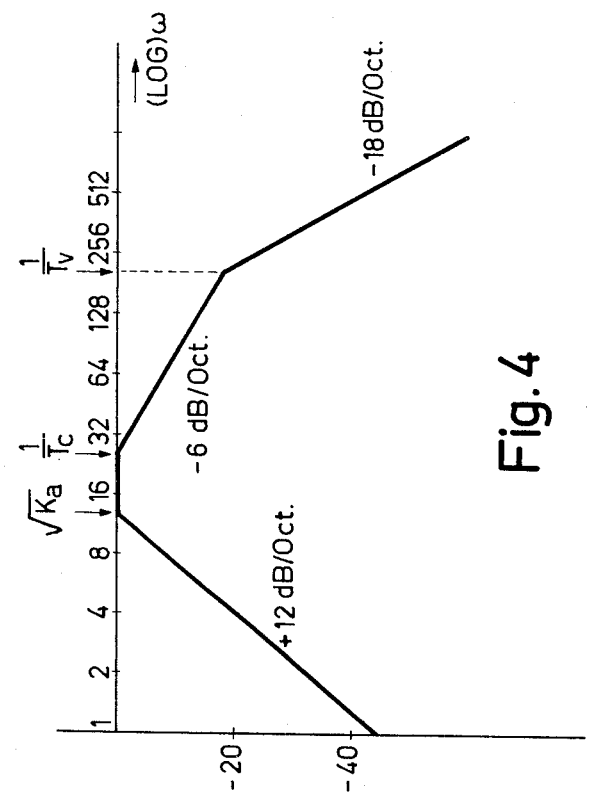
FIGS. 3A–3C and 4 illustrate some diagrams for further explanation.

In FIG. 1 the platform to be stabilised about the axes 1 and 2 is indicated by the numeral 3. This platform is suspended in a gimbal frame of which the inner gimbal ring is designated by the numeral 4 and the outer ring by 5. The outer gimbal ring, mounted parallel to the deck, is fixed to the ship. In the embodiment in question, the platform 3 carries a gyroscope housing 6, containing a vertical gyro 7 in cardanic suspension. This gyro is kept in such a position that its spin axis is directed normal to the earth surface. This occurs in the conventional way by means of two translation accelerometers (not shown in the figure) and, connected thereto, amplifier circuits and the torque motors 8 and 9 coupled to the gyro. The way in which the gyro is brought and held in a vertical position is further described in the Dutch patent application 7,017,134; for a good understanding of the present invention it is not deemed necessary to discuss this in more detail.

If the platform 3 is not in a perfectly horizontal position, i.e. the platform is not completely aligned with the gyro 7, then an error voltage is provided by one or both of the synchros 10 and 11 coupled to the gyro. In the following description, only platform and ship movements about the axis 1 will be considered. An analogous description applies to the axis 2, about which the platform can be tilted and with respect to which ship movements occur. Suppose that the synchro 11 provides an error voltage $\epsilon$. This error voltage is fed to a servo amplifier comprising a servo preamplifier 12 and, connected thereto, a servo final amplifier 15 with negative feedback via a motor-tacho combination 13, 14. The motor 13 controlled by the servo final amplifier tilts the platform, with the aid of the gear transmission system 16, about the axis 1 in such a way that the error voltage $\epsilon$ is reduced to zero, or that the platform is fully aligned with the gyro 7.

The servo amplifier may be of various designs. In the embodiment in question, the servo preamplifier 12 comprises successively a demodulator 17, a filter 18, so dimensioned as to adequately suppress the nutation frequency component originating from the gyro and present in the control signal, and an integrating network 19, whose function will be described hereinafter. The servo final amplifier 15 is in conformity with the Dutch patent application 7,106,851 and consists of an adding amplifier 20, which is fed with the output voltage of the servo preamplifier 12 and that of the tacho generator 14, an amplifier with compensating network 21 and an amplifier formed by a pulse length modulator 22 and a switching power bridge 23 with negative feedback, the motor 13 being incorporated in the bridge. The negative feedback last mentioned is realised through a control amplifier with integrating network 24 and the adding amplifier 25, and is used for obtaining an improved linear voltage gain characteristic. To ensure proper functioning of the servo final amplifier, the amplifier 21 is, due to the introduction of an integrating network in the negative feedback loop mentioned, also to be provided with an integrating network having a time constant preferably equal to that of the integrating network included in the negative feedback circuit. Since the specific design of the servo final amplifier is irrelevant to the present invention, the mere indication of the type used, as mentioned above, is considered to be sufficient. It should be noted, once more, that various other types of servo final amplifiers could be used.

The motor tacho combination 13, 14 is mounted on the outer gimbal ring 5. Assuming that the platform is aligned with the gyro, i.e. the error voltage $\epsilon = 0$ and that, subsequently, the ship is rolling about the axis 1, the motor housing will be subjected to a rotation corresponding with the ship's roll, and the motor shaft to a rotation with respect to the motor housing. The result of this shaft rotation is that the tacho generator 14 delivers a voltage which, being fed to the servo final amplifier 15, effectuates that the motor 13 tilts the platform such that an error voltage $\epsilon$ is obtained; this voltage provides, via the servo preamplifier, a partial compensation of the above-mentioned voltage delivered by the tacho generator.

According to the present invention, the servo final amplifier is fed with a correction voltage which is derived, via a demodulator 26 and a filter 27, from an angular velocity indicator 28, mounted on the gimbal ring 5. Similarly, the stabilisation system comprises a second angular velocity indicator 29, in order to compensate for the errors arising in the servo system which is provided for the alignment of the platform about the axis 2. With reference to FIG. 2, a description will now be given of the effect of the inclusion of the angular velocity indicator and the way in which the filter 27 must be dimensioned in order to obtain an optimal compensation for the above-mentioned servo errors, taking into account the characteristics of the servo preamplifier and the tacho loop.

In FIG. 2, the servo final amplifier 15, the motor 13 and the gear transmission system 16 are represented collectively by the unit 30; the transfer function of this unit is indicated by $H_1(s)$. The unit 31 shown in FIG. 2 represents the tacho generator, directly referring to the shaft rotation with respect to the gimbal ring 5; the transfer function of this unit is indicated by $H_2(s)$. The transfer function of the tacho loop is therefore represented by:

$$\frac{H_1(s)}{1 + H_1(s) \cdot H_2(s)},$$

which will be written as $$\frac{H_1(s)}{H_2(s)}.$$

The transfer function of the servo preamplifier 32, shown in FIG. 2 is $H_3(s)$. Finally, in FIG. 2 the angular velocity indicator with filter and demodulator is designated by 33. The transfer function of this unit is indicated by $H_4(s)$.

The transfer functions $H_1(s)$, $H_2(s)$ and $H_3(s)$ are expressed by:

$$H_1(s) = k_1 \frac{1}{s(1 + sT_m)(1 + sT_v)}$$
$$H_2(s) = k_2 \cdot s$$
$$H_3(s) = k_3 \frac{1 + sT_i}{sT_i}$$

where $k_1$, $k_2$ and $k_3$ represent the d.c. gain of the units 30, 31 and 32 respectively, $T_m$ the mechanical time constant of the motor plus the load coupled thereto, $T_v$ the electrical time constant of the servo final amplifier and $T_i$ the time constant of the integrating network 19 of the servo preamplifier. The quantities $k_1$, $k_2$, $T_m$ and $T_v$ are so selected that $$k_1 k_2 = \frac{T_m}{T_v} \gg 1.$$

Under this condition:

$$H_t(s) \simeq \frac{1}{1 + sT_v + s^2 T_v^2}.$$

In FIG. 2 the reference input characterised by the position of the gyro is indicated by $\Phi_t$, which is used for the alignment of the platform (of which the angular rotation is designated by $\Phi_{p1}$). For the error voltage $\epsilon$ delivered by the synchro 11 the following formula applies: $\epsilon = \Phi_t - \Phi_{p1}$; $\Phi_t$ and $\Phi_{p1}$ are related to a coordinate system predetermined with respect to the earth. Furthermore, the inputs $\Phi_d$ and $\Phi_s$ are indicated in FIG. 2. $\Phi_d$ represents the ship's roll, as experienced at the location of the platform; however, $\Phi_d$ also comprises the relative displacement (deformation) of the platform support with respect to the ship's axes. Although $\Phi_d$, in addition to the low-frequency ship movements, also contains high-frequency components (ship's vibrations) and other imperfections in the angular velocity measurement, e.g. as a result of gimbal errors and sensitivity to velocity components in other directions, these components are indicated separately by the spurious signal inputs $\Phi_s$, so that principally the low-frequency ship movements remain for $\Phi_d$. Thus, $\Phi_d + \Phi_s$ is the input for unit 33, while, on the other hand, $\Phi_d$ acts directly upon the platform movement in accordance with the formula: $\Phi_{p1} = \Phi_d + \Phi_m$, where, $\Phi_m$ represents the position of the motor shaft with respect to the gimbal ring 5. For the system thus realised the following formula applies:

$$\Phi_t - \Phi_d \left(1 - \frac{H_4(s)}{H_2(s)} \cdot H_t(s)\right) + \Phi_s \cdot \frac{H_4(s)}{H_2(s)} \cdot H_t(s) = \epsilon \left(1 + \frac{H_3(s)}{H_2(s)} \cdot H_t(s)\right)$$

The reference input $\Phi_t$ determined by the gyro 7 may be taken as zero. In the first instance, the influence of the low-frequency ship movements on the servo system will now be described, first assuming that $\Phi_s = 0$. The above relationship may be reduced to:

$$\frac{\epsilon}{\Phi_d} = - \frac{1 - \frac{H_4(s)}{H_2(s)} H_t(s)}{1 + \frac{H_3(s)}{H_2(s)} H_t(s)}.$$

From this it is seen that, by taking $$H_4(s) = \frac{H_2(s)}{H_t(s)},$$

the error voltage $\epsilon = 0$; that is, the platform remains aligned with the gyro, and the output voltage of the tacho generator, due to the ship's movement, is fully compensated by the correction voltage obtained with the aid of the angular velocity indicator.

Since the frequency components of $\Phi_d$ will be within the bandwidth ($1/T_v$) of the tacho loop and $H_t(s) \simeq 1$, within this bandwidth, it is sufficient to put $H_4(s)$ equal to $H_2(s)$. However, this condition cannot be attained, because $H_4(s)$ need not be constant. Thus, gradient variations in the angular velocity measurement may occur, for example, due to gimbal errors. $H_4(s)$ is now chosen as follows:

$$H_4(s) = k_2 s \cdot \frac{\alpha}{1 + sT_c};$$

where $\alpha k_2$ is the gradient of the angular velocity measurement. For optimal compensation $\alpha$ must equal 1. The filter 26 is therefore constructed as a low-pass filter; the time constant $T_c$ is, for example, so selected that the spurious signal input $\Phi_s$ is sufficiently attenuated; however, this will be discussed later. Within the bandwidth of the tacho loop the term $$1 - \frac{H_4(s)}{H_2(s)} \cdot H_t(s),$$

which introduces an additional attenuation with respect to $\Phi_d$, now becomes:

$$(1 - \alpha) \cdot \frac{1 + s \frac{T_c}{1 - \alpha}}{1 + sT_c}.$$

Therefore, for frequencies below $$\frac{1}{T_c} \left( << \frac{1}{T_v} \right)$$

the error reduction takes effect. It should also be noted that the more $\alpha$ deviates from 1, the smaller $T_c$ should be chosen, in order to obtain an acceptable low-frequency error reduction. The maximum improvement attainable is, however, limited to a factor of $1/1 - \alpha$.

Without compensation by means of unit 33, $$\frac{\epsilon}{\Phi_d} = - \frac{1}{1 + \frac{H_3(s)}{H_2(s)} \cdot H_t(s)}$$

after substitution of $H_2(s)$, $H_3(s)$ and $H_t(s)$ and assuming that $$\frac{1}{T_t} << \frac{1}{T_c} \text{ and } K_a T_v T_i << 1,$$

where $$K_a = \frac{k_3}{k_2 T_i},$$

the above expression may be approximated as follows:

$$\frac{\epsilon}{\Phi_d} = - \frac{\frac{s^2}{K_a}}{1 + sT_i + \frac{s^2}{K_a}}.$$

Figure 3A:
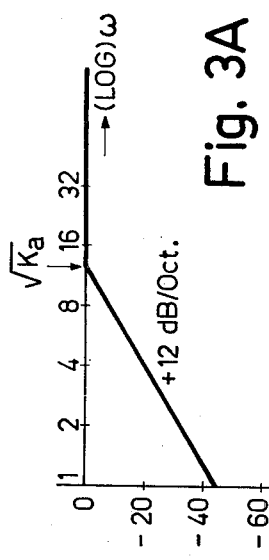
Figure 3B:
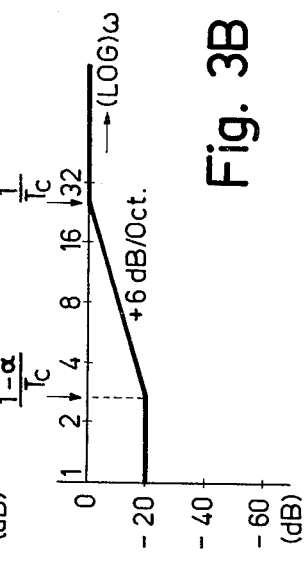
Figure 3C:
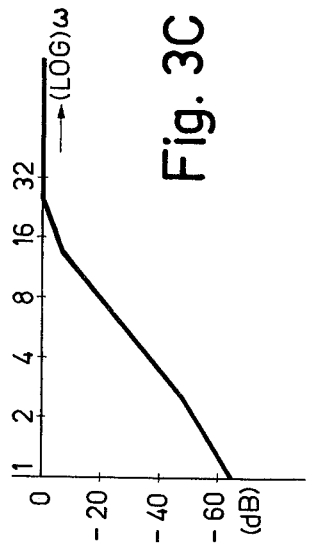

The Bode diagram of this expression is illustrated in FIG. 3A for $K_a = 160 \, sec^{-2}$, $T_i = 0.113$ sec, $T_v = 5.3 \times 10^{-3}$ sec. FIG. 3B shows the Bode diagram of the term introducing the additional attenuation:

$$1 - \frac{H_4(s)}{H_2(s)} \cdot H_t(s),$$

assuming that $\alpha = 0.9$ and $T_c = 0.04$ sec. Finally, FIG. 3C illustrates the Bode diagram of the combination of the two lastmentioned terms.

On considering the influence of the spurious signal input $\Phi_s$ on the servo system, and assuming that $\Phi_d = 0$, then:

$$\frac{\epsilon}{\Phi_s} = \frac{\frac{H_4(s)}{H_2(s)} \cdot H_t(s)}{1 + \frac{H_3(s)}{H_2(s)} \cdot H_t(s)}$$

After substitution of $H_2(s)$, $H_3(s)$, $H_4(s)$ and $H_t(s)$ and assuming the same values for $T_i$, $T_v$ and $K_a$, this expression becomes:

$$\frac{\epsilon}{\Phi_s} = \frac{\alpha}{1 + sT_c} \cdot \frac{\frac{s^2}{K_a}}{1 + sT_i + \frac{s^2}{K_a}} \cdot \frac{1}{1 + sT_v + s^2 T_v^2}.$$

The Bode diagram of this expression is illustrated in FIG. 4, where $\alpha = 1$, and the values for $K_a$, $T_i$, $T_v$ and $T_c$ are as above.

As seen from the figure, below the system bandwidth ($\sqrt{K_a}$) the interference suppression is determined by the transfer function of the main loop. Above the bandwidth the interference suppression is in the first instant dependent on $T_c$. For this reason, it would be favourable to take a rather large value for $T_c$. Besides, it should be considered that $\Phi_s$ itself is rather small, which is significant especially for the frequency range in the vicinity of the bandwidth limits.

It has already been pointed out that the selection of $T_c$ is also determined by the value which is assumed by $\alpha$; the more $\alpha$ deviates from 1 the smaller $T_c$ should be chosen, in order to obtain the most favourable low-frequency error reduction. On the other hand, if a larger value is taken for $T_c$, this may be important for a good high-frequency interference suppression; however, an excessively high value of $T_c$ affects the desired error reduction adversely. In addition, it should be taken into account that, in selecting a value for $T_c$, the system bandwidth should be limited, in view of the resonance frequencies arising, between approximately $2\sqrt{K_a}$ and $1/T_v$, introduced by the massresilient system composed of the platform and the transmission system. The selection of $T_c$ will therefore necessitate a compromise between all of these factors. However, the abovementioned value of $T_c = 0.04$ sec already renders a considerable error reduction.

What we claim is:

1. A system for the stabilization of a platform suspended in a gimbal frame to rotate about at least one axis, comprising a gyro hung on gimbals supported on said platform, means coupled between the gyro and the platform to derive an error signal, a combination of a motor with a tacho generator mounted on said gimbal frame and mechanically coupled to said platform to tilt it about said one axis, a servo loop including a servo-preamplifier driven by said error signal to produce a partial compensation signal, and a servo final amplifier having a plurality of inputs and an output for actuating said motor; one of said inputs being supplied by said partial compensation signal and another input by a negative feedback signal produced by said tacho generator, and an angular velocity transducer mounted on the gimbal frame outside the servo loop to generate a correction signal applied to a third input of said servo final amplifier.

2. System as claimed in claim 1 wherein a low-pass filter is provided between the angular velocity indicator and the servo final amplifier.

* * * * *